United States Patent
Widanapathirana et al.

(10) Patent No.: US 11,037,080 B2
(45) Date of Patent: Jun. 15, 2021

(54) OPERATIONAL PROCESS ANOMALY DETECTION

(71) Applicant: ACONEX LIMITED, Melbourne (AU)

(72) Inventors: Chathuranga Widanapathirana, Clyde North (AU); Karthik Venkatasubramanian, Glen Waverley (AU); Zaeem Bruq, Kensington (AU)

(73) Assignee: Aconex Limited, Melbourne (AU)

( * ) Notice: Subject to any disclaimer, the term of this patent is extended or adjusted under 35 U.S.C. 154(b) by 177 days.

(21) Appl. No.: 16/152,707

(22) Filed: Oct. 5, 2018

(65) Prior Publication Data

US 2019/0108471 A1    Apr. 11, 2019

(30) Foreign Application Priority Data

Oct. 5, 2017   (AU) ................................ 2017904030
Nov. 6, 2017   (AU) ................................ 2017904502

(51) Int. Cl.
  *G06Q 10/06*    (2012.01)
  *G06N 20/00*    (2019.01)

(52) U.S. Cl.
  CPC ..... *G06Q 10/063118* (2013.01); *G06N 20/00* (2019.01); *G06Q 10/06395* (2013.01); *G06Q 10/063114* (2013.01)

(58) Field of Classification Search
  CPC ... G06Q 10/063118; G06Q 10/063114; G06Q 10/06395; G06N 20/00
  See application file for complete search history.

(56) References Cited

U.S. PATENT DOCUMENTS

| | | | |
|---|---|---|---|
| 7,673,340 B1* | 3/2010 | Cohen | G06F 11/3438 379/266.08 |
| 10,362,057 B1* | 7/2019 | Wu | H04L 63/1491 |
| 10,554,817 B1* | 2/2020 | Sullivan | G06Q 30/01 |
| 10,904,270 B2* | 1/2021 | Muddu | G06F 3/04842 |
| 2004/0098300 A1 | 5/2004 | Karwatowski et al. | |
| 2005/0209897 A1* | 9/2005 | Luhr | G06Q 40/00 705/7.28 |
| 2008/0109730 A1* | 5/2008 | Coffman | G06Q 30/02 715/733 |
| 2009/0187474 A1* | 7/2009 | Longinotti-Buitoni | G06Q 50/26 705/329 |

(Continued)

*Primary Examiner* — Sujay Koneru
(74) *Attorney, Agent, or Firm* — Kraguljac Law Group, LLC

(57) ABSTRACT

Systems, methods, and other embodiments associated with anomaly detection are described. In one embodiment, a method monitoring an on-going project that comprises a plurality of processes and process activities that occur during the process. A machine learning model is applied that identifies a group of projects that are a similar type as the on-going and generates an expected level of process activities that are expected to occur. Based on a snap shot of the on-going project at a first time period, observed levels of process activities are determined that occurred in each process. The machine learning model compares for each of the processes, the observed levels of process activities to the expected levels of process activities in a corresponding time period. If the observed levels of process activities fail to fall within a range of the expected levels of process activities, an anomaly alert is generated and displayed.

17 Claims, 10 Drawing Sheets

(56) References Cited

U.S. PATENT DOCUMENTS

| | | | |
|---|---|---|---|
| 2010/0094687 A1* | 4/2010 | Waggaman, III | G06Q 10/06 705/7.42 |
| 2010/0262975 A1* | 10/2010 | Reysa | G06F 9/4843 718/105 |
| 2011/0035244 A1* | 2/2011 | Leary | G06Q 10/06314 705/7.13 |
| 2011/0071869 A1* | 3/2011 | O'Brien | G06Q 10/103 705/7.12 |
| 2011/0153506 A1* | 6/2011 | Patterson | G06Q 10/10 705/301 |
| 2015/0019658 A1* | 1/2015 | Barrera | H04L 51/16 709/206 |
| 2015/0143344 A1* | 5/2015 | Davis | G06F 11/3636 717/129 |
| 2016/0140204 A1* | 5/2016 | Brown | G06Q 30/0202 707/602 |
| 2016/0196136 A1* | 7/2016 | Thippavajjula | G06Q 10/06395 717/101 |
| 2016/0210577 A1* | 7/2016 | Amundson | G06Q 10/06312 |
| 2017/0063910 A1* | 3/2017 | Muddu | G06N 5/022 |
| 2017/0185592 A1* | 6/2017 | Frei | G06F 16/41 |
| 2017/0220340 A1* | 8/2017 | Hoshino | G06Q 10/0635 |
| 2017/0364795 A1 | 12/2017 | Anderson et al. | |
| 2018/0248905 A1* | 8/2018 | Cote | G06F 17/18 |
| 2018/0270312 A1* | 9/2018 | Shah | G05B 13/048 |
| 2018/0357556 A1* | 12/2018 | Rai | G06Q 50/06 |
| 2018/0374052 A1* | 12/2018 | Mogal | G06T 17/05 |

* cited by examiner

OPERATIONAL PROCESS ANOMALY DETECTION

CROSS REFERENCE TO RELATED APPLICATIONS

This disclosure claims the benefit of Australian Provisional Patent Application serial number 2017904030 filed Oct. 5, 2017, titled "Project management improvements", and assigned to Aconex Limited; and also Australian Provisional Patent Application serial number 2017904502 filed Nov. 6, 2017, which are both incorporated by reference herein in their entirety.

BACKGROUND

During production of a product or performance of a project, e.g., construction of a building, etc, data is gathered regarding a status of the project (and project sub-steps) at various stages. The status might include specific technical information, activity logs, or schedule tracking, etc. Project management systems may collect such information and output data in a spreadsheet or presentation including raw data as well as line/bar graphs showing progression of the project. Such data may then be presented to appropriate parties in one or more charts which are limited in scope and are complicated in nature. From these general charts, decisions may be made as to how the project is progressing. However, these systems do not or cannot appropriately detect problems in the project because they rely on a user to make decisions. These prior systems show data in isolation and often without context which could result in sub-optimal decision making. Furthermore, the prior systems do not allow for a way to incorporate learnings or knowledge from previous projects.

SUMMARY

In one embodiment, a computer implemented method is described that is performed by a computing system including at least one processor and memory for at least executing instructions. The method comprises: monitoring an on-going project that comprises a plurality of processes that are performed during the on-going project over a time range, wherein each process of the plurality of processes includes process activities that occur during the process; applying a machine learning model that (i) identifies a group of projects that are a similar type as the on-going project and (ii) is configured to detect anomalous processes; wherein the machine learning model calculates an expected level of process activities that are expected to occur for each of the plurality of processes during each of the plurality of time periods, for each process, the machine learning model determines the expected level of process activities based at least in part on historical activity levels for each of the process activities for similar projects, and in part, on the level of other related activities observed concurrently in the project, or that occurred in a given process in a given time period compiled from the group of projects, as well as some concurrent activity data from the project; taking a snap shot of the on-going project at a first time period and determining observed levels of process activities that occurred in each of the plurality of processes; comparing the observed levels of process activities to the expected levels of process activities in a corresponding time period; if the observed levels of process activities fail to match, within a defined range (or between threshold values) of the expected levels of process activities in the corresponding time period, generating an anomaly alert for the associated process; and generating a display including an identification of the plurality of processes of the on-going project and visually distinguishing one or more of the processes for which the anomaly alert was generated.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide an early warning system for on-going projects. In one embodiment, the system and method is based on machine learning techniques that monitor and identify anomalies in various processes that occur during the on-going project. The present system provides a novel technique for identifying and addressing anomalies in a timely manner that helps reduce or eliminate adverse outcomes at later stages of the on-going project (e.g., cost blow-outs, schedule over-runs, increased project costs). This further improves the operation of the project by avoiding to waste resources later in a project in order to cure problems by identifying anomalies earlier in the project.

System and Method Overview

In one embodiment, the system and method combines different process activities such as project correspondence or mails that are sent and received, documents created and transmitted, workflows created and executed that is collected from historical projects with client-provided data on overall project performance. In some embodiments, the data is anonymised. The data is used to construct a training set and apply regression analyses, classification analyses and novel anomaly detection analyses to construct a model that calculates a probability of an ongoing project performing inefficiently, poorly, or indeed failing, and/or construct a model predicting an ongoing project performing inefficiently, poorly, or indeed failing. The present system and method may for example identify and highlight specific behaviour which are likely to lead to subsequent problems in the project and increase a risk of failure. For example, problems in the project may include cost blow-outs, schedule over-runs and increase of risk factors. The system and method may identify and highlight features for determining the calculation of the probability and then communicate this information to a client device.

In some embodiments, the system and method provide an early warning system which may for example generate alerts, and/or provide an ability to investigate a project that is behaving or being performed abnormally, which has a potential to experience difficulties. The early warning system can function independently to issue alerts and notifications to users, but may also provide an input into a recommendation system where solutions, guidelines and specific resolutions are generated to mitigate any issues detected.

Figure 1:
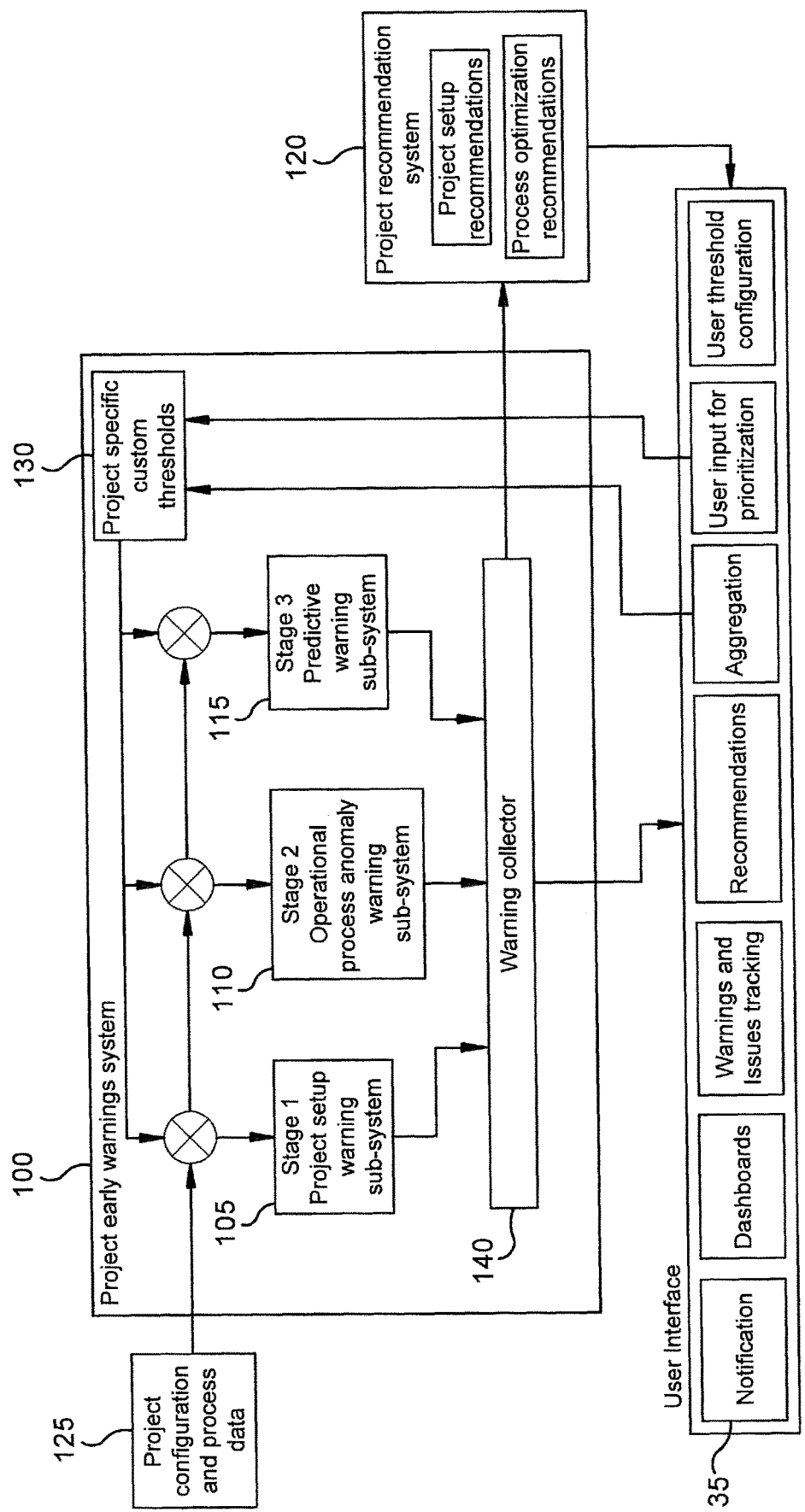
FIG. 1 is a schematic depicting an example project early warning system according to one embodiment.

With reference to FIG. 1, in one embodiment, an early warning system 100 may comprise three sub-systems to cover various stages of the project: a project setup warning sub-system 105, an operational process anomaly warning sub-system 110 and a predictive warning sub-system 115.

In one embodiment of the project setup warning sub-system 105, when a project is initially setup in a project management system, the project configuration, process types being used during the project, process configuration, partner selection, personnel selection etc are evaluated to raise potential issues that could cause issues relating to various aspects of the project. The sub-system 105 inputs into a recommendation system 120, which generates best practice and historical data-based recommendations for project setup. The project setup warning sub-system 105 is described in more detail with reference to FIG. 3.

In one embodiment of the operational process anomaly warning sub-system 110, when the project is ongoing, the sub-system 110 may continuously monitor progress of the project, including process efficiency and other aspects including process efficiency, schedules, expenses, quality of communications, reviews, safety incidents and other aspects of projects through independent detection modules tuned for each task. If any configured parameters start to deviate from acceptable limits (which for example may be predetermined norms or other defined value limits or ranges), one or more alerts may be issued as a means of notifying project stakeholders as early as possible about a potential problem. The process anomaly warning sub-system 110 is described in more detail with reference to FIGS. 4 and 5.

In one embodiment of the predictive warning sub-system 115, the sub-system 115 monitors (for example continuously calculates) how current and previous activities on the project may impact future operations of the project through predictive analytics and simulation. If such activities indicate a future potential issue, alerts are generated to one or more client devices indicating a future potential issue based on a specific behaviour. The predictive warning sub-system 115 is described in more detail with reference to FIG. 9.

With continued reference to FIG. 1, data inputs 125 into the project early warning sub-system 100 according to one embodiment may be of selected types of project configuration and process data. Such data may be received from the project management system that defines parameters of the project, and/or from a project collaboration system. Data inputs 125 may also come from one or more other systems such as finance or scheduling systems, resource planning system, time sheeting, and specialised additional data streams, for example Building Information Modelling systems for the construction industry, etc. all of which may provide additional project configuration data and process data for defining various processes and activities that are part of the project. In one embodiment, the system 100 is configured to allow a user to add custom modules by adding new data streams to the system for example, as internet of things devices such as sensors.

In one embodiment, data inputs 125 into the project early warning system 100 may include best practice guidelines for a particular project type including guidelines for how and what people interacting and operating the project should do. This may for example include thresholds 130 for various parameters input by end users, user prioritization, best practice threshold defaults determined by the project management software provider, etc.

Inputted data is processed to identify any potential issues and if an issue is identified a corresponding output is issued. In some embodiments, input data is categorized into corresponding warning levels which are processed to arrive at a warning output value. In some embodiments, processing of warning levels is performed according to an equation for n separate data inputs:

$$xLa + yLb + \ldots + kLn = WO$$

Where:

La=Warning level for data input a (for example time data);

Lb=Warning level for data input b (for example cost data);

Ln=Warning level for data input n;

x, y, . . . k=weight multiplier

WO=Warning Output.

In some embodiments, processing of input data 125 is undertaken using a lookup table or list with data parameters that match warning levels, where the warning levels increase according to a degree of risk associated with each input variable. For example, a project time delay of 0 days may be assigned a zero warning level for the time input (indicating that no issue exists), but a 10 day delay may be assigned a warning level of 3 (indicating a more serious warning).

In some embodiments, input data 125 and 130 is processed using predictive analytics and simulation. A number of techniques may be used for such analysis. For example, in some embodiments, the technique may comprise one of the following techniques or combinations of: Linear regression, Multivariate regression, Decision trees, Generalised neural network classification, Neural network regression, Support vector regression, Support vector classifications, K-means clusters, Gradient boosting, and/or Random forests.

In some embodiments a warning output is further processed to arrive at a corresponding communication message and defined warning actions to be undertaken by the system and/or a user. Such warning actions may be of any suitable type. For example, a warning action may request additional reporting to more senior personnel, or a creation of a report, or for certain additional criteria to be met.

Outputs from one or more embodiments of the system 100 may be of a selected type. In some embodiments, one or more outputs from the system 100 is transmitted to a graphical user interface 135 that is generated and displayed on a device. In one embodiment, the model is dynamic and responds to process activities in real time to modify and update the display accordingly. End users may then receive and observe the outputs via the graphical user interface 135. The interface 135 may be a web-based SaaS interface that can function independently or as an added module on a project management platform. The interface 135 may be used to display warnings, (in some embodiments it may comprise an ability to undertake at least partial root cause diagnosis), operational dashboards, tracking of resolution of issues/warnings. In some embodiments, the user interface 135 is configured to provide functionality for one or more features including access links to each subsystem 105, 110, and 115, input fields for configuration settings, and output displays. The interface 135 may including features, for example: notification displays, dashboards showing project parameters and metrics, warning alerts and issue tracking, recommendations for addressing a warning, data aggregation options, user input for prioritization of selected projects parameters, and/or threshold configuration to change threshold values for warnings.

In some embodiments, there is provided a second output from the system 100 which may be output into the recommendation system 120. The recommendations system 120 is configured for example to use warnings, related parameters and historical outcomes to generate recommendations to resolve issues related to an identified warning. More details for each sub-system 105, 110, and 115 will be described in more detail with reference to the other figures.

In another embodiment, the project early warning system 100 includes a warning collector 140 that is a module configured to receive outputs from the sub-systems 105, 110, and 115. The warning collector 140 aggregates warnings and anomalies identified for the project and sends aggregated warning and/or anomaly data to the interface 135 for display.

Figure 2:
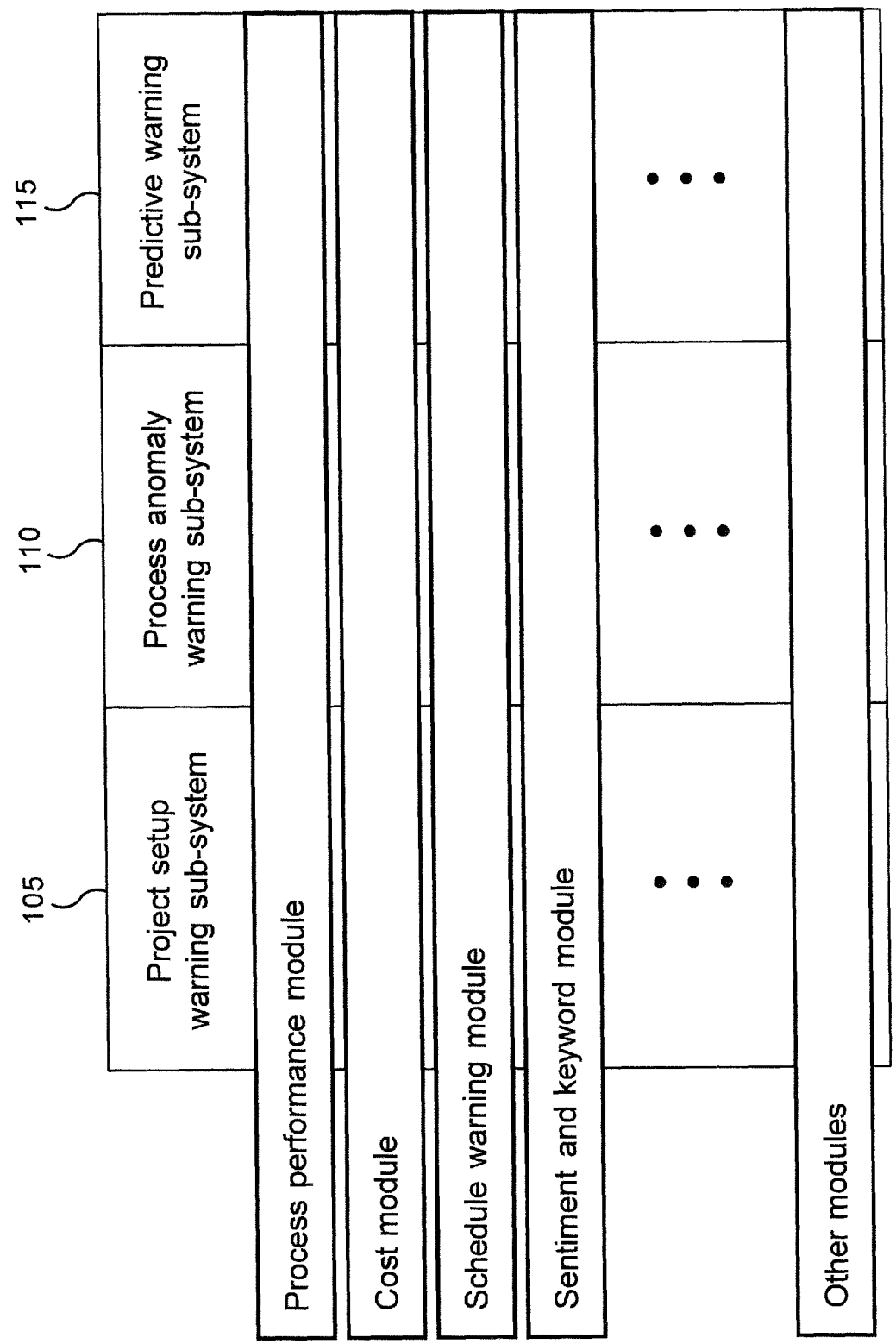
FIG. 2 is a schematic depicting various modules of the system in one embodiment.

With reference to FIG. 2, a user may add one or more executable modules (detection modules) to the sub-systems 105, 110, and/or 115 to extend the functionality across various aspects of the project. Examples of functions may be project time-line warnings, budget overruns, resourcing, health and safety issues, process bottlenecks, design flaws, partner and collaboration difficulties.

Project Setup Warning Sub-System 105

Figure 3:
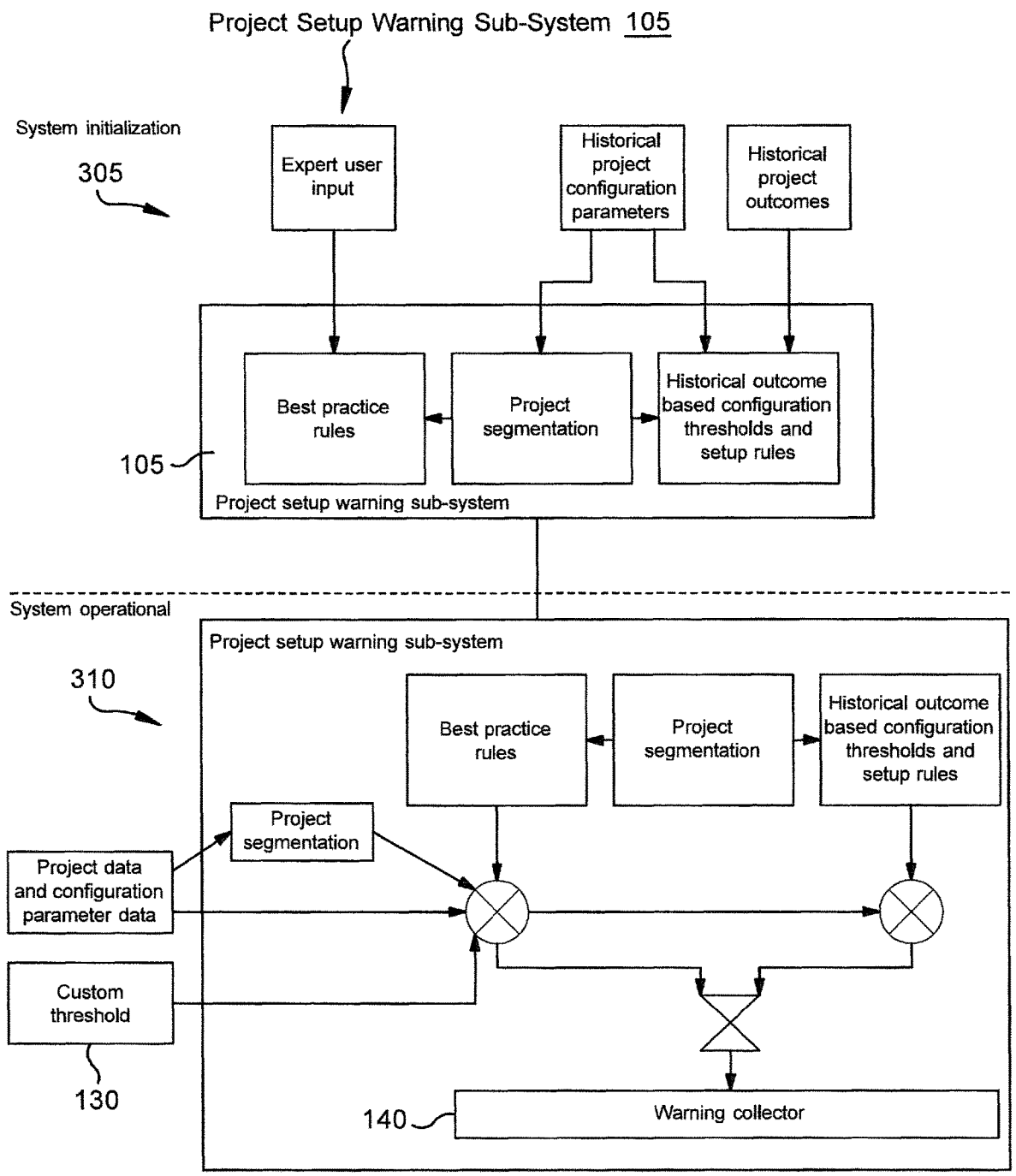
FIG. 3 is a schematic depicting an example project setup warning sub system according to one embodiment.

With reference to FIG. 3, a schematic is illustrated depicting one embodiment of the project setup warning sub system 105 (from FIG. 1). The project setup warning sub system 105 is configured to provide an early stage warning as to potential inefficiencies or negative outcomes for a project based on project configuration, process selection, process configuration, partner selection, personnel selection etc. In this example, there are two stages: a system initialisation/initiation stage 305 and a system operational stage 310.

During the initiation stage 305, the system and method is set up to detect issues based on historical learning and best practices obtained from, for example, previous similar projects and observed data from the similar projects. Inputs into this stage may be of any selected type, for example, in some embodiments, they may comprise one or more of:
  Historical project configuration parameters;
  Historical project outcomes;
  Historical project performance measures;
  Project parameter history; and
  Expert user defined input.

A newly created project is assigned into one or more segments or project types based on one or more project attributes. Based on one or more factors, such as historical outcomes and historical process performance measures, a profile of expected parameter ranges for different project types is created for each of the parameters being tracked. Profile ranges and values may be stored in data structures stored in a database as an expected baseline for the project.

In one embodiment, calculated parameter ranges may be over-ridden by a user, for example if expert user recommendations are different than historical values. This functionality may for example be automatically set to trigger once an expert user recommendation is entered, or it may be switched on or off by a user of the system. In one embodiment, in order to access this feature and make changes to definitions, the system includes an authorization step and requests credentials from a requesting user that has appropriate access privileges.

During the operational stage 310, a new project that has been setup is analysed and compared against the initialized system (from stage 305) to identify potential deviations from expected ranges and determine associated risks.

Inputs into the operational stage 310 may be of any suitable type, for example, in some embodiments, the inputs may comprise one or combinations of:
  Project attributes for segmentation assignment;
  Project configuration data;
  Project data for parameter calculation; and
  Custom thresholds defined by project users.

In one embodiment, the project setup warning sub-system 105 is configured to perform a computer implemented project analysis and warning method (performed by at least one processor) comprising: receiving configuration data in relation to an intended project into a data store; determining one or more project attributes based on the configuration data; processing the determined project attributes and assigning the project to one or more segments based on the determined project attribute(s); based on one or more of configuration data and project data, determining one or more project parameters; determining one or more expected project parameters based on the one or more segments; optionally modifying the one or more expected project parameters based on one or more user-defined thresholds; comparing the one or more expected project parameters with the one or more project parameters and selectively applying a weighting to one or more of such parameters; processing the comparison results to identify one or more deviations from one or more expected values (the comparison optionally by reference to a threshold); issuing an alert based on the one or more deviations.

Process Anomaly Warning Sub-System 110

Figure 4:
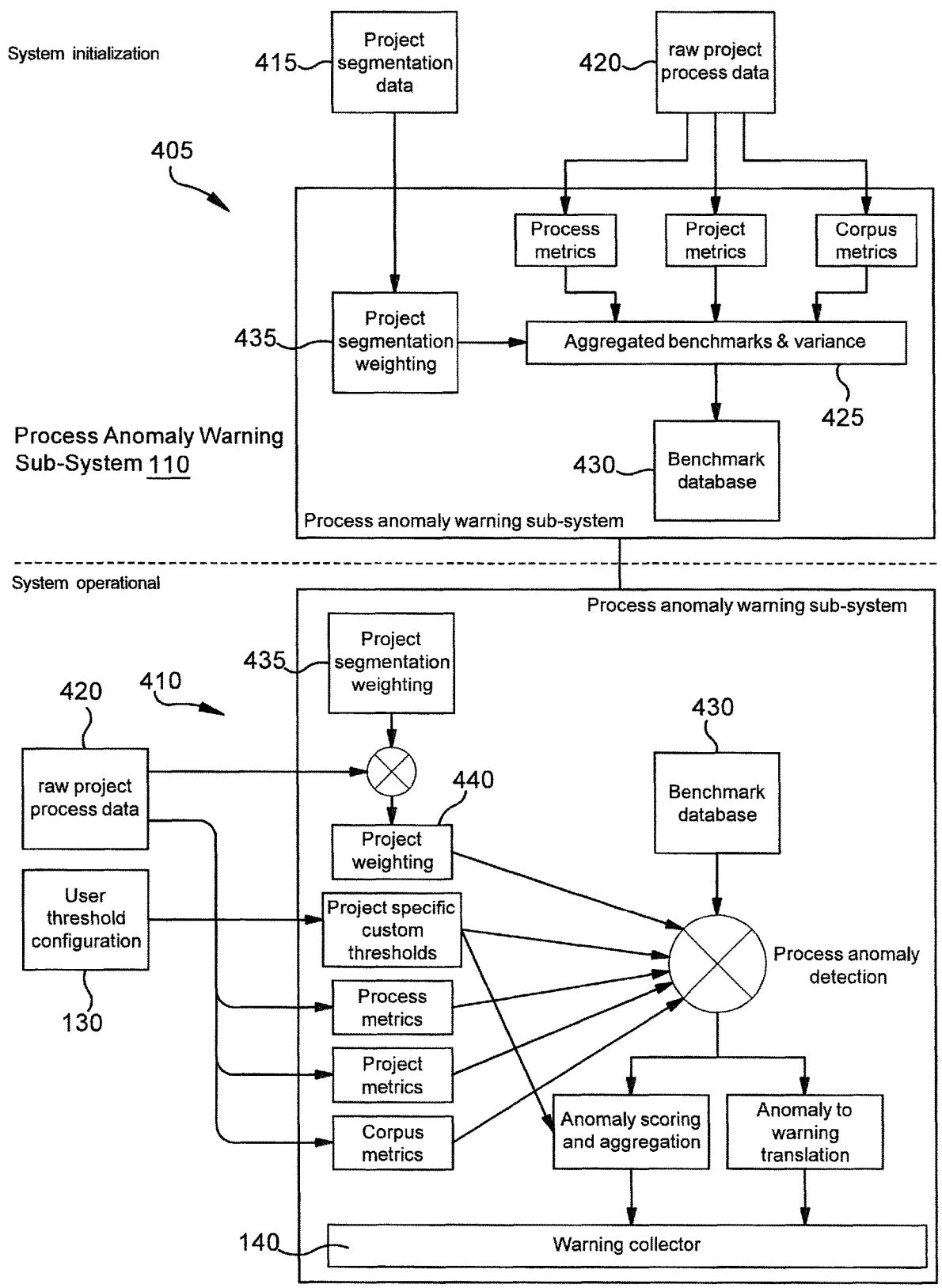
FIG. 4 is a schematic depicting an example process anomaly warning sub-system according to one embodiment.

With reference to FIG. 4, one embodiment of the process anomaly sub-system 110 is shown. The process anomaly sub-system 110 is configured to monitor an ongoing project and ongoing operational processes of the project for anomalous behavior. The sub-system 110 is an AI-based monitoring and anomaly detection system. If anomalous behavior or process activities are found in one or more processes of a project, warnings are generated and raised to highlight potential problems. In one embodiment, the sub-system 110 has two stages: an initiation stage 405 and an operational stage 410.

As an overview, in one embodiment, a project includes and is defined with a plurality of processes that are performed during the project over a time range. For example, if the project is a construction project of a building, the construction project includes multiple processes that are performed during the construction. Each different process can be identified and defined according to selected guidelines that describe the project. Further, each process includes sub-components called process activities that occur during the process. Each process and each process activity can be identified by an associated type identifier.

As used herein, a "process activity" is represented and defined as a high granularity record of tasks that are performed during a corresponding process. Process activities include, for example, individual email messages transmitted and/or received during a process, documents created during the process, documents registered or transmitted during the process, and workflows requested, started or completed during the process. Accordingly in one embodiment, activity types that are defined and monitored include mail, documents, and workflows. These activity types may be further subdivided into sub-types at a more granular level: i.e. various email types, document types, tenders & bids, workflow types, and/or other types of activities that can be part of a project process.

In one embodiment, the sub-system 110 monitors an ongoing project, or a collection of projects, for an organization in near-real time (e.g., daily and/or weekly) and detects unusual statistical patterns in activity data using a custom machine learning algorithm. During the ongoing project, the sub-system 110 identifies and counts a number of occurrences for each type of process activity. For example, in a generic project that includes a process called "Request for Information (RFI)," there may be two process activities identified that included three (3) email correspondence and two (2) documents of type X generated and transmitted (distributed) to project participants. The number of occurrences of a process activity is referred to as an observed count or an observed level, which are used interchangeably.

As will be described in more detail herein, the observed levels of process activities are calculated and compared to expected levels of process activities for corresponding processes in corresponding time periods calculated by the machine learning model. The expected levels and other calculated values are stored in one or more data structures that are accessible by the computing system. Anomalies are then detected based on the comparisons, and associated alerts are generated. In one embodiment, the sub-system 110 combines the detected anomalies with contextual metadata to associate the anomalies with a project component, stage or task, and then displays the anomaly information to the interface 135 for a human decision maker.

The sub-system 110 is implemented with a machine learning model. The machine learning model is trained, in one embodiment, on historical data from projects similar to the project being monitored; e.g. projects of the same type, in the same industry sub-sector, run by the same organization, or an intersection of two or more of these categories.

The sub-system 110 and machine learning algorithm calculates expected levels (counts) and confidence bands for each activity type over time-windows of fixed length (e.g. daily or weekly) and compares the actual observed activity levels of each type with the calculated confidence bands. A confidence band (or tolerance, e.g. 80%, 90%, 95% etc.) can be set with default values and/or by a user via the interface 135.

In one embodiment, the machine learning algorithm used to calculate the expected activity levels and confidence bands is implemented and trained based on the following (tested) hypothesis: For a given project type, in a particular industry sub-sector, or in the practice of a given organization, the levels of various activities are mutually correlated and corroborate each other. Furthermore, a joint distribution of various activity types is similar between various projects that are similar to each other in a selected group.

In one embodiment, the machine learning algorithm of the process anomaly warning sub-system 110 provides for computerized anomaly detection for process activities that previously were not possible by previous computerized project management systems. Previous systems relied on manual review of a project and relied on a person's subjective opinions, which were subject to errors. Furthermore, previous manual review did not consider or perform any of the implemented functions of the present system.

The present sub-system 110 with the machine learning algorithm provides for more accurate and automatic anomaly detection based, at least in part, on the following implemented observations and conditions: (1) the sub-system 110 estimates a component-wise joint distribution of project activities using activity data from selected historical projects that are similar to the project being monitored; (2) The joint distribution of activity types over projects of the same type, in the same industry sub-sector, and run by the same organization is largely stable over time; (3) Actual recorded values of a subset of the process components activity data for a given time slice is enough to calculate expected values and confidence bands for the remaining process activity types in the given time-slice.

With reference to the initiation stage 405 in FIG. 4, the initiation stage 405 is configured to set up the sub-system 110 with expected normal behavior benchmarks and expected variation levels across various project segmentations.

Input into the initiation stage 405 may comprise a variety of project data, for example: generic project metadata 415 for segmentation of components. These are project specific attributes that can help create a profile of a project that will be monitored. Additional input may include historical process execution data 420 to derive process related metrics for each segment of the project. The data 420 includes historical data about process activities that were performed during different processes from previous projects that are similar to the monitored project in type. Project-specific metadata and project metrics can be used for example to normalize the historical data to a standard baseline. Corpus metrics may be included that are derived from free text written by project users. The input metrics may then be aggregated together to form aggregated benchmarks 425 and variance data that define and characterize a project and its processes, which are stored in data structures in a benchmark database 430.

According to at least one embodiment, project metadata and segmentation data 415 is used to classify projects into various segments that show different process execution behavior. A segmentation weighting metric 435 is created based on the segmentation to be used in scaling and normalizing the benchmarks 425.

Process metrics may be derived from raw process interaction data 420. The process metrics for a given process are representative of process length, process efficiency, process complexity, collaborating parties and steps involved in completing the given process.

Project metrics (specific to the type of project) may be derived from individual historical projects to normalize benchmarks and variance levels for process execution metrics. Normalizing the data allows projects of different scales to be combined.

In one embodiment, raw project data may contain large amounts of free text input into the sub-system 110 in the form of reviews, comments and correspondence from previous similar projects. Such free text may be extracted and a corpus is generated to collate text fields. Metrics from the corpus are then created such as sentiment levels, keyword counts, length of communication, language complexity and key topics.

Process execution metrics may then be combined with project metrics and corpus metrics to create baseline behavior (e.g., aggregated benchmarks 425) expected in an ongoing project of a similar type. Given the stochastic nature of real-world projects, natural variations are expected. These variations based on historical data may also be calculated.

The process metrics, projects metrics, corpus metrics, segmentation matrix, benchmarks and variation data may be stored in data structures in the benchmarking database 430.

Accordingly in one embodiment, the initialization stage 405 is configured to be executed by a computing device and cause the computing device to perform a computer implemented project analysis method comprising: processing project metadata and/or segmentation data to classify a project into a segment wherein the segment is characterized by a predetermined process execution behavior; creating a weighting metric based on the segmentation, the weighting to be used in scaling and normalizing benchmarks; optionally deriving one or more process metrics from raw process interaction data; deriving one or more project specific metrics from individual historical projects; extracting one or more sources of free text data to generate a corpus to collate one or more text fields; creating one or more metrics from the corpus which may comprise one or more of sentiment levels, keyword counts, length of communication, language complexity and key topics; combining one or more process execution metrics with one or more project metrics and one or more corpus metrics to create a set of baseline behaviors expected in the project; storing in the benchmarking database one or more of: the process metrics, the projects metrics, the corpus metrics, the segmentation matrix, the benchmarks and variation data.

Figure 5:
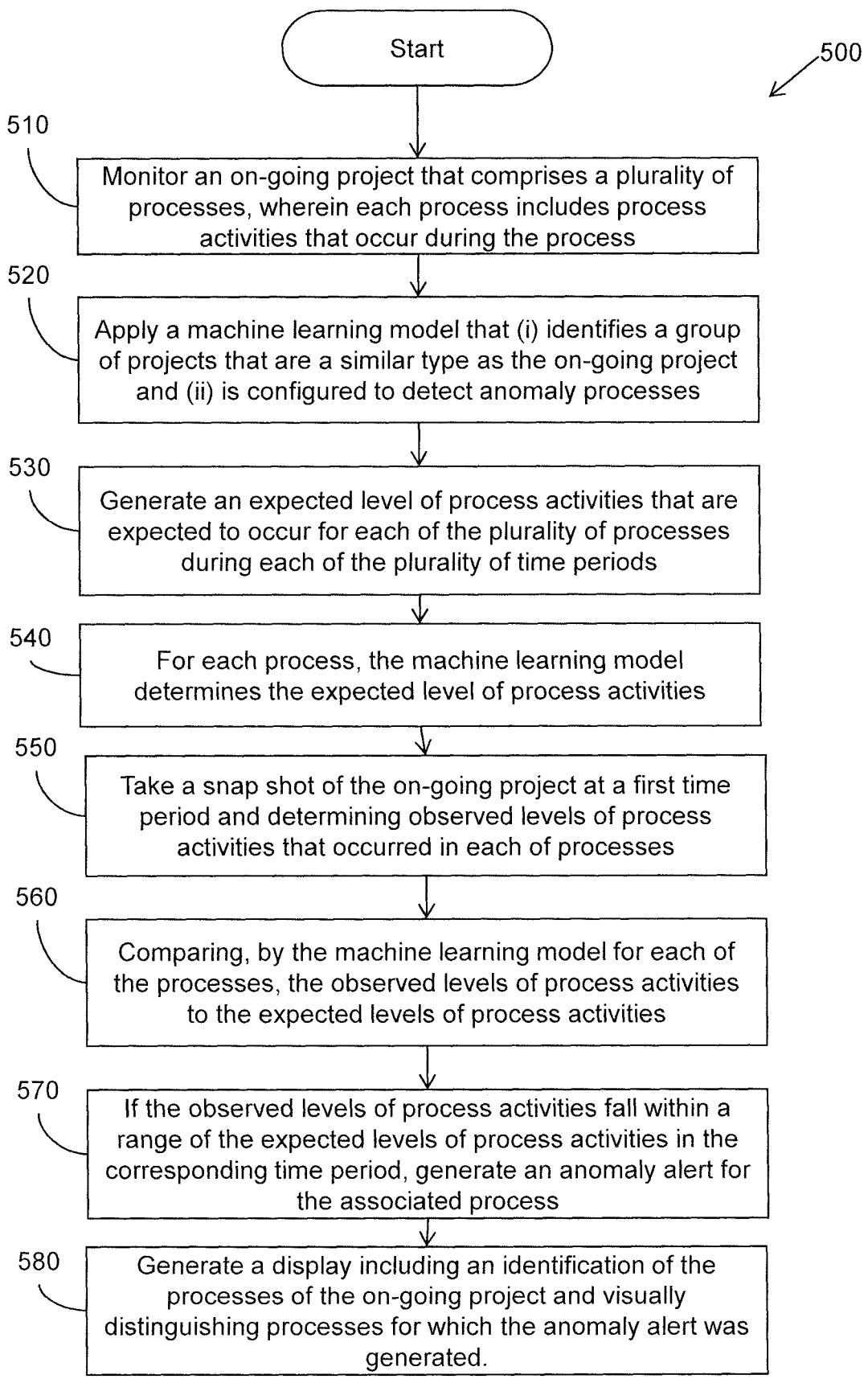
FIG. 5 illustrates one embodiment of a method associated with process anomaly detection.

The operational stage 410 of the process anomaly warning sub-system 110 will be described with reference to FIG. 4 and FIG. 5. FIG. 5 illustrates one embodiment of a computer implemented method performed by the process anomaly warning sub-system 110 to monitor and detect anomalies in processes of a monitored on-going project.

Inputs for the operational stage 410 may include a variety of data types that were input into the initialization stage 405. For example, in some embodiments the input may include one or combinations of: project metadata to identify project segment, raw process data for deriving process metrics, raw text data for deriving corpus metrics, user defined thresholds 130 (from FIG. 1) specific to the monitored project.

Project metadata may be compared against the segmentation weighting 435 and a project weighting matrix 440 that is specific to the project may be derived. The project weighting matrix 440 helps to account for project-to-project differences that occur in real world projects.

Process metrics and corpus metrics similar to the metrics calculated in the initiation stage 405 are calculated from raw process execution data. These metrics provide a snapshot of a current process state of the on-going project being monitored.

Project-specific weighting and calculated metrics may then be compared against the benchmarking database 430, for example created during the initiation stage 405. This comparison is done on the specific project segment to account for inherent differences between segments. Each metric for the project is compared against an expected range for example to identify a level of deviation from the expected range and a deviation direction.

With reference to FIG. 5, one embodiment of a method 500 performed by the process anomaly warning sub-system 110 is shown that monitors an on-going project and detects anomalies related to process activities performed or not performed in corresponding processes. Method 500 is a computer implemented method performed by a computing system including at least one processor and memory for at least executing instructions, which when executed by the at least one processor cause the processor and/or the computing device to perform method 500. Method 500 is shown as a series of blocks that represent functions/actions being performed. However, the functions/actions may be performed in other orders, and/or one or more functions/actions may occur concurrently with other functions/actions.

Method 500 may be initiated when a project is selected to be monitored and/or by initiating the process anomaly warning sub-system 110 from a computing device. The project is referred to as an on-going project while the project is being performed until it is completed.

At block 510, the on-going project is monitored. As stated previously, the on-going project comprises a plurality of processes that are performed during the on-going project over a time range. Each of the processes include process activities that occur during the process.

As previously stated, a "process activity" is represented and defined as a high granularity record of tasks that are performed during a corresponding process. Process activities include, for example, project correspondence or mails that are sent and received, documents created and transmitted during the process, workflows created and executed during the process, individual email messages transmitted and/or received during a process, and workflows requested, started or completed during the process, and other defined activities. Each identified process of the on-going project is monitored to identify at least which process activities are performed for a corresponding process and when the activity occurs. The system monitors the on-going project and data is collected and recorded that at least identifies each process being performed, a time period for each process, each process activity performed during each process and an associated date/time period, and may include other selected components of the on-going project.

At block 520, the system applies a machine learning model that (i) identifies a group of projects that are a similar type as the on-going project and (ii) is configured to detect anomaly processes. For example, if the on-going project is a construction project for a commercial building, the machine learning model identifies other similar construction projects for which historical project data (including associated process data) has previously been inputted into the system 100.

At block 530, based on at least the historical project data from similar projects, the machine learning model generates an expected level of process activities that are expected to occur for each of the plurality of processes during each of the plurality of time periods. The expected level(s) is stored in memory and/or a data structure. For example at block 540, for each process that is part of a similar project, the machine learning model determines the expected level of process activities based at least in part on historical activity levels for each of the process activities for similar projects, and in part, on the level of other related activities observed concurrently in the project, and/or that occurred in a given process in a given time period compiled from the group of projects that are similar. This is described in more detail below.

As an example, for a given current project P in progress that is being monitored, and given process or activity types X, Y and Z being performed as part of project P, the algorithm finds historical projects H1, H2 and H3 that match project P in various ways (e.g. project type, project size, industry sub-sector, country, etc.). The algorithm then learns how activities X, Y and Z were performed in the historical projects by estimating the joint distributions of activities X, Y and Z. Contextual data includes how the level of one activity (say X) depended on concurrent levels of other activities (say Y and Z), and what other activities were being performed at the same time. Contextual data may also include other project metadata like project stage, specific teams or other participating organizations involved in the observed activities X, Y and Z, etc.

At block 550, the system 110 takes a snap shot of the on-going project at a first time period and determines observed levels of process activities that occurred in each of the plurality of processes. For example, the snap shot may be determined based on observed data inputted into system 110 via the user interface 135 that identifies what processes and what associated process activities have been performed to-date. This observed data may also be automatically collected from various databases associated with the on-going project that record and/or measure data from the project. In one embodiment, the snap shot at a given time is created by retrieving the observed data from the project.

In one embodiment, the observed data from the snap shot may be parsed and segmented to identify each process and each associated process activity that has occurred in the on-going project. This may be performed by using a defined list of process types and process activity types. The data may then be grouped to associate each process with its corresponding process activities that belong to the process. The observed levels for each process activity is determined and this is repeated for each different process. For example, if process X includes six occurrences of process activity A (e.g., email was transmitted six times), then the observed level of process activity A is six.

At block 560, the machine learning model compares, for each of the processes identified, the observed levels of process activities to the expected levels of process activities in a corresponding time period. The machine learning model performs an anomaly detection algorithm to determine and calculate whether an anomaly is detected in the observed levels of process activities based on the expected levels that occurred in the same process type from the learned historical project data. In one embodiment of the anomaly detection algorithm is described below.

In one embodiment, the machine learning model (and its anomaly detection algorithm) compares the observed levels of process activities by contextually comparing a combination of the expected levels of process activities that should occur in the corresponding time period to a combination of the observed levels of process activities. For example, in a given process X, the type and/or number of process activities that are observed are compared in context to the other types and numbers of process activities that occurred in the process X. Contextual metadata may be defined for process X based on the learned historical project data that provides combinations of expected levels of process activities.

Thus in one embodiment using the contextual metadata, the anomaly detection algorithm does not simply identify a process activity as anomalous if the activity is observed to occur a number of times that is too high or too low (based on the expected level for that activity alone, though it may). The anomaly detection algorithm identifies an activity that is too high or low given a surrounding context of other concurrent process activities that are also expected in the process at that point in time.

For example, the expected levels of activities for process X may be defined as: if there are five counts of process activity type-A, then there should also be three counts of process activity type-B. A contextual threshold value(s) may be set for each process based on the learned data. If this contextual combination does not occur in the observed process X, then an anomaly alert is generated for associated process X if the observed combinations fail to match or fall within the contextual threshold value(s) or a defined range.

In another embodiment, the project-specific weighting 440 and calculated metrics (from the raw project process data 420) may be used to compare the observed levels against expected levels from the benchmark database 430 to identify a level of deviation from the expected levels or values. In another embodiment, a deviation direction from the expected levels may be determined and outputted as part of an anomaly alert message.

At block 570, if the observed levels of process activities fail to match (within a threshold, contextual and/or individually) or fall within a defined range of the expected levels of process activities in the corresponding time period, the sub-system 110 generates an anomaly alert for the associated process. In one embodiment, the anomaly alert is a message and/or signal that identifies the process which included a suspected anomaly related to one or more process activities. The message and/or signal may also be stored as a data record.

Figure 6:
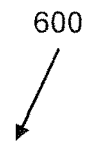
FIG. 6 illustrates one embodiment of a graphical user interface displaying anomaly warnings detected by the system.

At block 580, a display is generated that includes an identification of the plurality of processes of the on-going project. An example display is shown in FIG. 6 that illustrates a graphical user interface 600 generated with boxes (in one embodiment) where each box represents one type of process from the on-going project. The display is generated to visually distinguish one or more of the processes for which the anomaly alert was generated. In one embodiment, the machine learning model is dynamic and responds to process activities in real time to modify and update the display accordingly.

With reference to FIG. 6, the bolded/highlighted boxes represent processes that had an anomaly alert generated. In other embodiments, other forms of visual display and distinguishing graphics may be generated to identify the processes with anomalies (e.g., a displayed list of identified processes). In this manner, detected anomalies are mapped recognizable processes/components of the on-going project that are easy for a user to interpret. The graphical display may then be transmitted to one or more client devices for display so that attention may be given to the on-going project to resolve the identified anomalies.

In many projects, certain types of anomalies are a leading (in time) predictor of adverse project outcomes like delays, cost overruns and unexpectedly high number of issues reported at later stages of a project. However, these types of anomalies were not detectable by previous project systems (or by human investigators) until it was too late causing additional problems in the project at later stages. The present system provides a novel technique for identifying and addressing anomalies in a timely manner that helps reduce adverse outcomes at later stages of the on-going project.

Anomaly Detection Algorithm

In one embodiment, the anomaly detection algorithm of the machine learning model may be configured and implemented as follows. The algorithm applies to blocks 530-540 of FIG. 5 for generating the expected levels and block 560 for comparing the observed levels of the on-going project.

Recall that a "process activity" refers to high granularity records of tasks that occur during a process like project correspondence or mails that are sent and received, documents created and transmitted, workflows created and executed, and/or individual email messages.

The algorithm defines and represents a multi-dimensional time series by $X(t)=\{X_1(t), \ldots, X_n(t)\}$, i.e. X(t) as a time series indexed by t, and each time slice is an n-dimensional vector with components $X_i(t)$, i=1, . . . n. The components represent the various activity types, while a time slice is a daily or weekly observation of the n activity types.

F represents a joint distribution of the activity types, i.e $F(x_1, \ldots, x_n) = P(X_1(t) \le x_1, \ldots, X_n(t) \le x_n)$. This function can be estimated or 'learned' from historical data using one of several machine learning methods (e.g. kernel density estimation or a random forest model) that are then customized with the present algorithm, data inputs and conditions.

Once an estimate of F is available, the algorithm calculates conditional probabilities like $P(X_1)(t) > x_1 | X_2(t) = x_2, \ldots, X_n(t) = x_n)$. This probability quantifies a contextual behavior of $X_1(t)$ if $X_2(t), \ldots, X_n(t)$ are known.

For instance, if this probability is smaller than p, we can conclude that $X_1 > x_1$ is unlikely given the observations $x_2, \ldots, x_n$, and $X_1$ is deemed an anomaly at time t. The decision threshold P is user adjustable and represents the tolerance of a user to unusual statistical activity.

The algorithm tests each component $X_j(t)$ of the time series in turn, as anomalous or non-anomalous (e.g., routine values) at time slice t, by calculating the probability $P(X_j(t) > x_j | \cap_{i \ne j} X_i(t) = x_i)$ for each j=1, . . . , n, and compare with a decision threshold $p_j$.

In one embodiment, more generally, the algorithm can highlight anomalous interactions between various activities/components of the time series. Individual activities/components $X_i$ and $X_j$ may individually test as routine (non-anomalous), but viewed together, the pair of values $\{X_i = x_i, X_j = x_j\}$ may be an exceedingly unlikely occurrence. Thus a possible anomaly is detected. To highlight these anomalous interactions, the algorithm calculates the joint distribution of a k-tuple $X_1(t), \ldots, X_k(t)$ of any combination of k elements of X(t) conditioned on the (n–k)-tuple of the remaining elements of X(t), for all possible values of k≤n: $P(X_1(t) > x_1, \ldots, X_k(t) > x_k | X_{k+1}(t) = x_{k+1}, \ldots, X_n(t) = x_n)$. If this probability is small, the combination of observed values of $X_1(t), \ldots, X_k$ is deemed anomalous and an alert is generated.

In one embodiment, the algorithm takes advantage of a particular structural property of project activity data that has been observed and collected in historical project data: If a group of projects is sufficiently homogeneous, e.g. same project type, in the same country (i.e, following the same industry practices, rules and regulations), in the same industry sector/sub-sector, (e.g. Construction/Residential & Commercial, or Infrastructure/Road & Rail, or Energy/Mining, etc.) and/or run by the same organization, then the joint distribution of the (counts of) various activity types in a given time-slice at a given stage of the project is similar. This means that we can use time-series data from carefully selected historical projects to estimate or learn the joint distribution F.

In one embodiment, the algorithm is implemented with the observation that if Y and Z are low dimensional and complementary projections of X, (i.e., k-tuples and (n–k)-tuples of activity types), then the algorithm can calculate the conditional distribution of Z given Y using the aforementioned joint distribution F of components of X. Then any observed time slice (or snapshot) Y(t) can be used to estimate the concurrent time slice Z(t) with good accuracy, and calculate confidence intervals for these estimates. These estimates, along with associated confidence intervals can then be compared with the observed values of the time slice Z(t) to identify and highlight anomalous values.

In one embodiment, a prediction function becomes more accurate if the dimension of Z is no greater than the dimension of Y. This process is then permuted so that every activity type appears in Y for at least one permutation.

Thus in one embodiment, the anomaly detection algorithm identifies an anomaly for a process activity that is too high or low given the surrounding context of other concurrent activities in the associated process.

The anomaly detection algorithm also uses contextual metadata to map the anomalies to project processes, activities/components, phases or tasks, and to determine the most business-critical anomalies and report them on a graphical user interface such as a dashboard to a human decision maker.

Recall that our data consists of vector-valued time-series that are non-periodic, and do not have external observable predictors that we can use to build a model. As far as we are aware, this approach to detecting anomalies in a time-series of this nature is unique and novel.

In one embodiment, datasets used to train, test and run the machine learning models include process activity types and sub-types. For example, as shown in Table 1:

| Activity Type | Activity Sub-type |
|---|---|
| Mail | RFI |
| Mail | Delay Notice |
| Mail | Architects' advice |
| . . . | . . . |
| Document | Administration |
| Document | Project Management |
| Document | Engineering |
| . . . | . . . |
| Workflow | Design Review |
| Workflow | Drawing Approval |
| Workflow | . . . |

Figure 7:
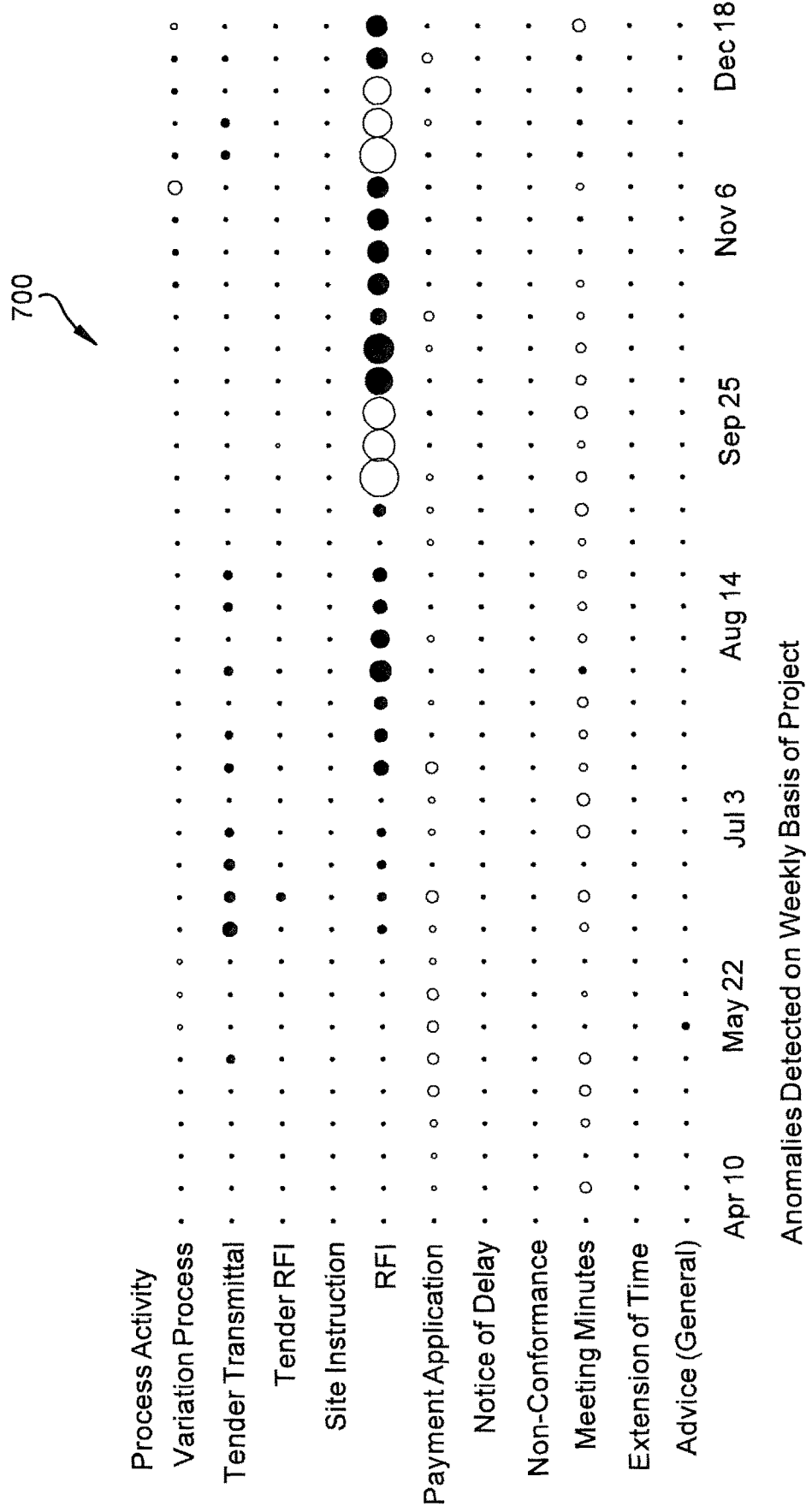
FIG. 7 illustrates one embodiment of a visual graphic showing anomalies detected on a weekly basis for a number of process activity types of a project.

In one embodiment, for a given project in progress to which the present model is applied, the process anomaly warning sub-system 110 generates on a daily or weekly basis, an expected value and confidence bands for each type of selected process activity types. FIG. 7 illustrates one embodiment of a graphical display 700 that shows a list of process activity types (along Y-axis) and various weeks (along X-axis). The process activities are from a construction project but other types of projects may be used. Confidence bands are displayed as varying sizes of dots where a larger dot represents a larger severity of an occurrence of an anomaly in the corresponding process activity during a time period.

Based on the project-specific thresholds 130 (see FIG. 1), anomalous metrics may be filtered to select only highly anomalous metrics. In some embodiments, a scoring is applied to each detected anomaly based on the severity of anomaly. Scores may then be aggregated to translate anomaly levels to a score that is understandable by a non-technical user.

Identified anomalies may then be transformed into warnings for example as shown in FIG. 6 based on a pre-defined mapping to process activities. Unknown anomalies may be displayed in an unmapped form, allowing a project user to determine if the anomaly represents a potential problem and requires a warning or other action.

Figure 8:
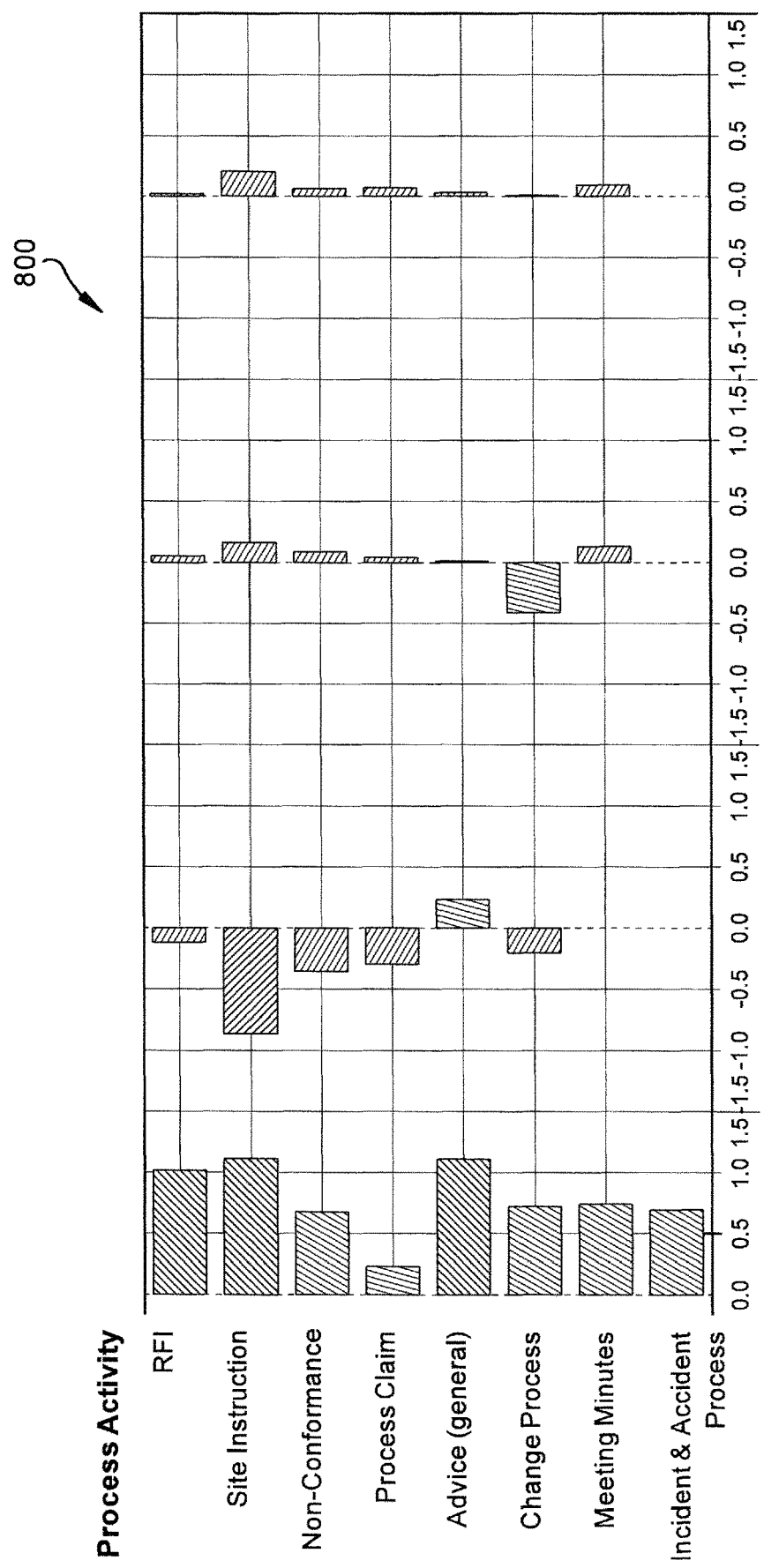
FIG. 8 in one embodiment of anomalies mapped with contextual metadata to construction process activities.

In another embodiment, the sub-system 110 may generate contextual metadata related to the anomalous process activity: e.g., users assigned to the activity, teams or project components generating the anomalous activity. Both the anomalies and the related contextual metadata is further mapped to a project component, e.g. façade design, electrics, structural design, etc. One embodiment of anomalies mapped with contextual metadata to construction processes and activities is shown in FIG. 8 as contextual graph 800.

Predictive Warning Sub-System 115

Figure 9:
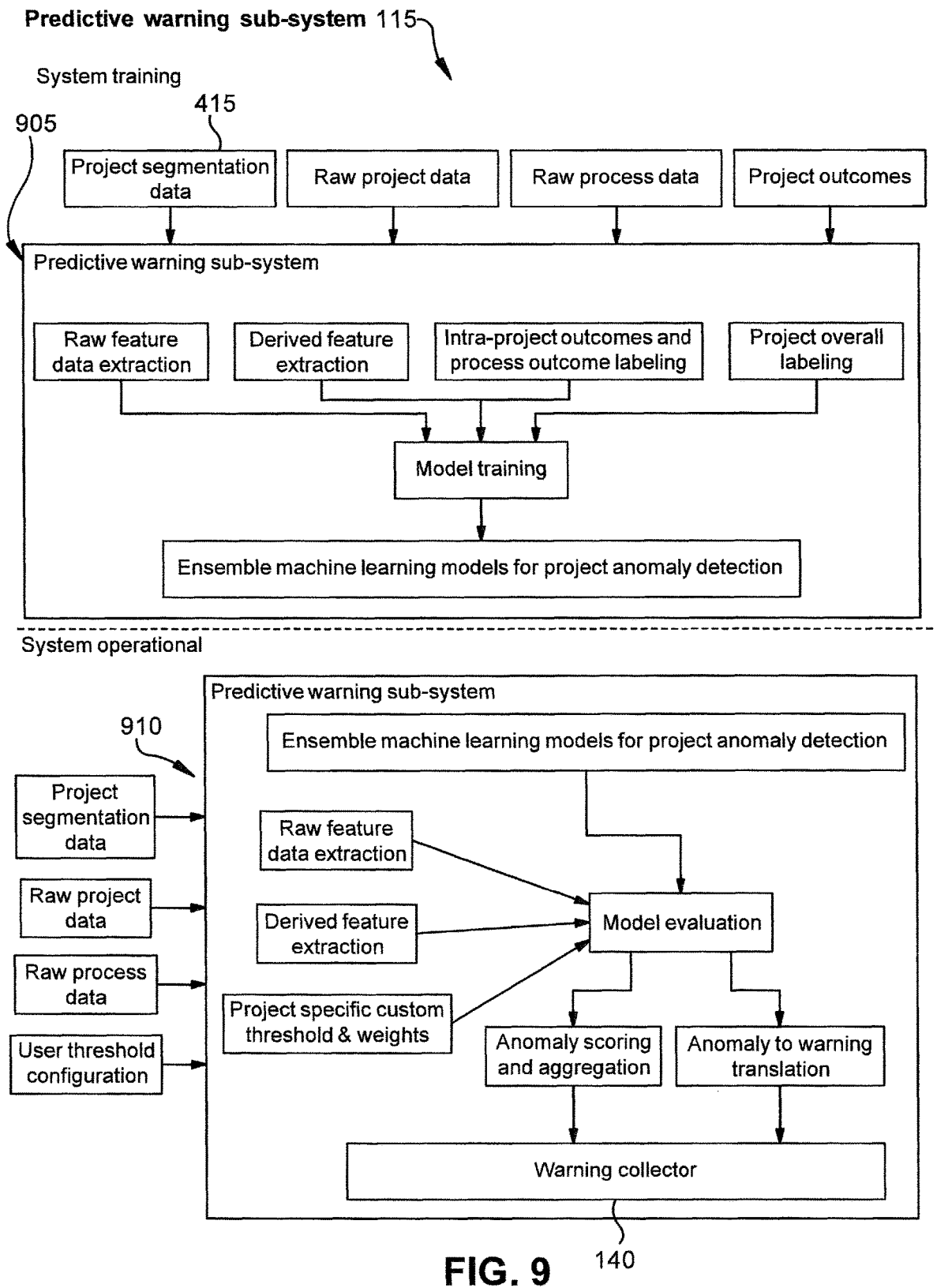
FIG. 9 is a schematic depicting an example predictive warning sub-system according to one embodiment.

With reference to FIG. 9, one embodiment of the predictive warning sub-system 115 is shown. The predictive warning sub-system 115 is the third sub-system of the early warning system 100 (shown in FIG. 1).

Based on the previous techniques of machine learning from the other sub-systems 105 and 110, the predictive warning sub-system 115 may for example use historical data to learn and model complex process interactions that might lead to project performance difficulties and predict an ongoing project's likelihood of facing similar problems in the future. Similarly named data and elements in FIG. 9 correspond to previous data and elements in previous subsystems 105 and 110 shown in FIGS. 1, 3 and 4 since the subsystems are interconnected.

In one embodiment, the predictive warning system 115 may comprise an initiation (training) stage 905 and an operational stage 910 wherein the operational stage 910 continually re-trains (re-initiates) the machine learning models. Consequently, over time the system 115 learns to detect more and more anomalies which indicate early warning signs.

Initiation (first training) stage 905 sets up the system 115 by training initial models using historical data as previously described. Inputs into this stage may be of any suitable type, and may for example comprise one or more of:

Historical project segmentation data;
Historical raw project metadata;
Historical raw process data including time lines and schedules;
Historical project outcomes;
Historical specific project problem flags and milestone outcomes;
Early stage project setup model for historical projects (created in earlier sub-system); and
Process anomaly detection models (created in earlier sub-system 110).

According to one embodiment, input data is processed to extract direct features (metrics) that represent process characteristics such as execution efficiency, project segment, project profile, process volumes, process execution performance. Timelines may be used to derive the evolution of metrics over the duration of the project.

Extracted features (metrics) are combined using various mathematical techniques to derive additional metrics that can represent complex process behavior. Table 2 sets out example metric features.

TABLE 2 example metric features

| Project | Process | Collaboration | Other |
|---|---|---|---|
| Project value | #active processes | #correspondence | Sentiment value |
| #project | #missing | #correspondence | # keywords |

TABLE 2-continued example metric features

| Project | Process | Collaboration | Other |
|---|---|---|---|
| participants | processes | types | |
| #organizations | Level of delay | #documents | User maturity |
| #active users | Steps in process | #reviews | #inspections |
| #days elapsed | Completion rate | #links | #issues found |
| Stage/ percentage completion | Completion time | Communication link performance | #issues fixed |
| Project type | #Rejections | connectedness | #Models in use |
| Project region | Step completion rate | #inactive users | #Models transmitted (BIM) |

Non-limiting examples of derived metric calculations may for example comprise:

Multiplication of two or more metrics; Addition of two or more metrics; Difference between two or metrics; Average of a metrics; Median of a metric; Time window addition, average, median of a metrics; Covariance between two of more metrics; Ratio between two metrics; Metric rounding up or down; Metric categorization or grouping (e.g. group continuous value to groups <10, 10>&>1000); Frequency of metric overshoots over a threshold; Principal Components of a set of metrics; LDA components of a set of metrics; Normalized value of a metrics; Scaled value of a metric; Binary representations of a categorical variable (categorical to numerical conversion); Standard deviations of a metric; Fourier transform of a metric; Inverse term frequency;

In one embodiment, project milestone outcomes and historical intra-project problem flags are used to label processes to indicate the historical outcomes or performance or process execution. Project outcomes are used to label overall project performance across various outcome metrics.

In one embodiment, all of the metrics raw and derived, and together with labels are used to train models of varying granularity. Some models are process specific and trained to detect process problems. Some models are based on a specific overall project outcome and trained to identify when that outcome is at risk. The models together act as an ensemble where each model is trained to detect macro or micro process anomalies that might lead to sub-optimal performance.

The operation stage 910 of the trained system is used to compare ongoing projects against trained models. Models are trained to identify specific anomalies that can lead to performance problems and put projects at risk.

Inputs for the operational stage 910 can be of any suitable type, and in some embodiments they comprise one or combinations of: Project segmentation data; Raw project metadata; Raw process data including timelines and schedules; Early stage project setup metrics (created in earlier sub-system); and Process anomaly detection metrics (created in earlier sub-system).

In one embodiment, the same metrics calculations (as for the initiation stage 905) are applied to the incoming data from a project to calculate raw and derived features (metrics). The extracted features together with custom thresholds or ranges specific to the project are compared against the trained ensemble model.

The models (which are used in the process anomaly warning sub-system 105) detect specific anomalies in different processes that could lead to project performance problems, process performance problems or milestone specific problems. These detected anomalies are scored by considering the severity of the problem, the likelihood of having a negative performance impact and for example a pre-defined weighting across the ensemble.

In one embodiment, scores may be aggregated to derive an overall predictive warning score. Each anomaly which is predicted to cause a performance problem may be translated to warnings using labels derived above and a mapping between models to warnings.

Warnings may be sent to the warning collector 140 which then sends the information to the user interface 135.

In one embodiment, a computer implemented project analysis and warning system comprises: a data store to receive input data; at least one processor to:

process input data to extract direct features (metrics) that represent process characteristics; optionally compare one or more process characteristics to a timeline to derive the evolution of metrics over the duration of the project; combine one or more extracted features (metrics) are combined using various mathematical techniques to derive additional metrics that can represent complex process behavior; indicate one or more historical outcomes or performance or process execution by labelling one or more project milestone outcomes and/or historical intra-project problems; use one or more project outcomes to label overall project performance across one or more outcome metrics; train a plurality of machine learning models based on one or more derived process metrics; and apply a plurality of such machine learning models as an ensemble where each model is trained to detect macro or micro process anomalies that might lead to sub-optimal performance.

Cloud or Enterprise Embodiments

In one embodiment, the project early warning system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the project early warning system 100 system is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 10:
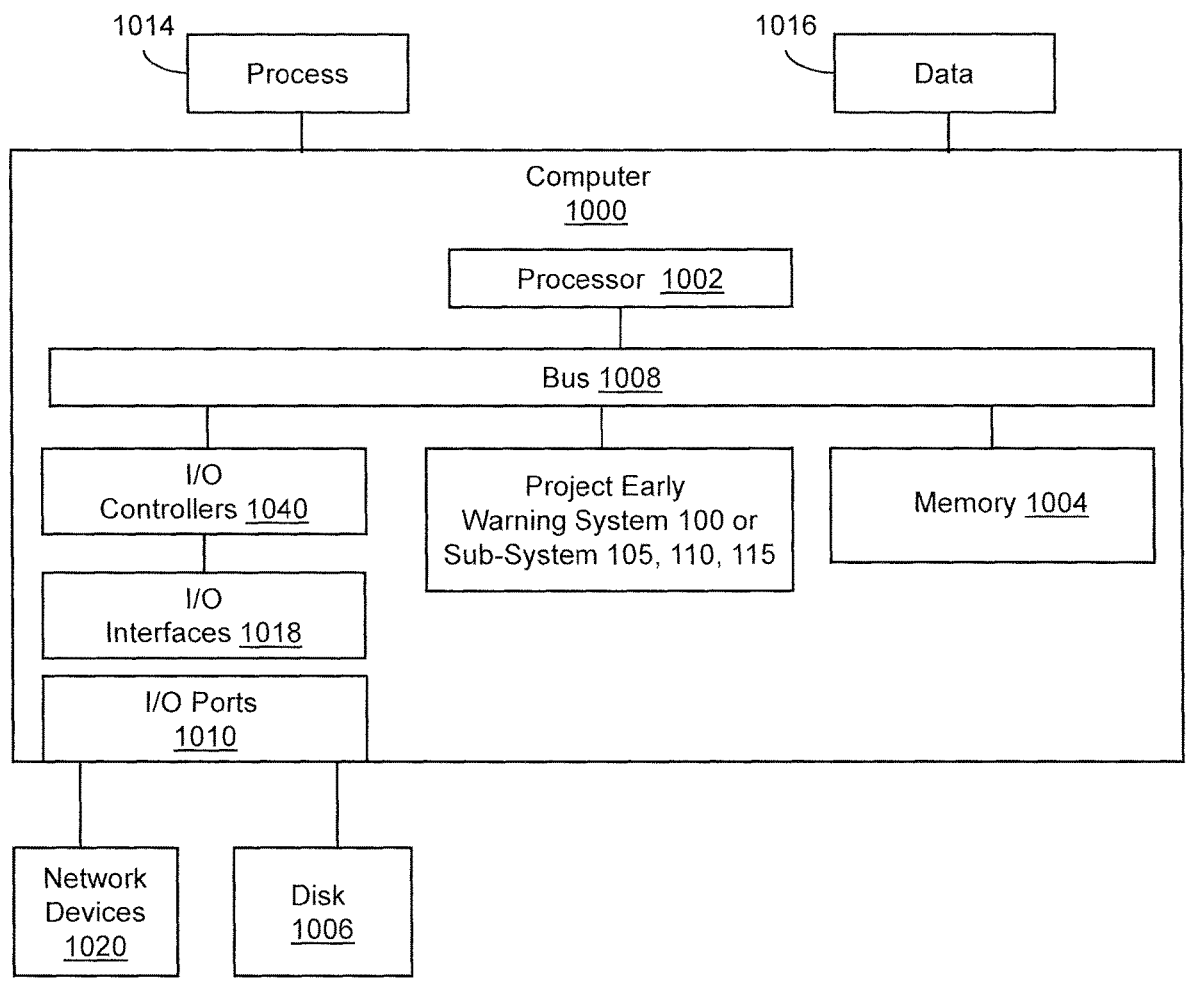
FIG. 10 illustrates an embodiment of a computing system configured with the example systems and/or methods disclosed.

FIG. 10 illustrates an example special purpose computing device that is configured and/or programmed with one or more of the example systems and methods described herein, and/or equivalents. The example computing device may be a computer 1000 that includes a processor 1002, a memory 1004, and input/output ports 1010 operably connected by a bus 1008. In one example, the computer 1000 is configured and implemented with one or more portions of the project early warning system 100 (shown in FIG. 1) or one or more sub-systems 105, 110, and/or 115. The computer 1000 is configured to facilitate anomaly detection based on process activities and the machine learning model previously described, including method 500.

In different examples, the project early warning system 100 may be implemented in hardware, a non-transitory computer-readable medium with stored instructions, firmware, and/or combinations thereof. While the project early warning system 100 is illustrated attached to the bus 1008, it is to be appreciated that in other embodiments, the project early warning system 100 is implemented in the processor 1002, stored in memory 1004, or stored in disk 1006 as executable instructions.

In some embodiments, the computing device may be a server operating in a cloud computing system, a server configured in a Software as a Service (SaaS) architecture, a smart phone, laptop, tablet computing device, and so on.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A storage disk 1006 may be operably connected to the computer 1000 via, for example, an input/output (I/O) interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The computer 1000 may interact with input/output (I/O) devices via the I/O interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the I/O interfaces 1018, and/or the I/O ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer implemented method performed by a computing system including at least one processor and memory for at least executing instructions, the method comprising:
monitoring an on-going project that comprises a plurality of processes that are performed during the on-going project over a time range, wherein each process of the plurality of processes includes process activities that occur during the process;
applying a machine learning model that (i) identifies a group of projects that are a similar type as the on-going project and (ii) is configured to detect anomaly processes;
wherein the machine learning model generates an expected level of process activities that are expected to occur for each of the plurality of processes during each of the plurality of time periods,
for each process, the machine learning model determines the expected level of process activities based at least in part on historical activity levels for similar projects, and in part, on the level of other related activities observed concurrently in the project;
taking a snapshot of the on-going project at a first time period and determining observed levels of process activities that occurred in each of the plurality of processes, wherein the observed level of a process activity is calculated as a number of occurrences within the snapshot of the process activity;
comparing, by the machine learning model for each of the processes, the observed levels of process activities to the expected levels of process activities in a corresponding time period;
if the observed levels of process activities fail to fall within a range of expected levels of process activities in the corresponding time period, generating an anomaly alert for the associated process; and
generating a display including an identification of the plurality of processes of the on-going project and visually distinguishing one or more of the processes for which the anomaly alert was generated.

2. The method of claim 1, wherein comparing the observed levels of process activities includes:
contextually comparing a combination of the expected levels of process activities that should occur in the corresponding time period to a combination of the observed levels of other concurrent process activities; and
generating the anomaly alert for the associated process if the combinations fail to match or fall within a contextual threshold value or range.

3. The method of claim 1 wherein the process activities are a set of one or more records that includes records of project workflow actions that request, create, start, execute, or complete a workflow during the on-going project, wherein each record associates a workflow action with a process of the on-going project and a time during the on-going project.

4. The method of claim 1 further including:
processing project-specific weighting and calculated metrics to compare the observed levels of process activities against a benchmarking database to identify a level of deviation from the expected levels of process activities.

5. The method of claim 1 wherein the snap shot is a daily observation of numbers of occurrences of each of multiple types of process activity.

6. The method of claim 1 wherein the snap shot is a weekly observation of numbers of occurrences of each of multiple types of process activity.

7. The method of claim 1, further comprising:
learning a joint distribution function of multiple types of process activity from historical data by the machine learning model;
calculating a conditional probability that quantifies contextual behavior of each type of process activity at a given time given observed values for each other type of process activity from the joint distribution function;
testing observed values for each type of process activity at the given time in turn to determine whether the conditional probability for the observed value satisfies a decision threshold indicating that the observed value is anomalous; and
where the observed value is anomalous, indicating that the observed levels of process activities fail to fall within the expected levels of process activities.

8. The method of claim 1, further comprising generating contextual metadata related to anomalous process activity underlying the anomaly alert, including at least one of (i) users assigned to the anomalous process activity, or (ii) teams or project components generating the anomalous process activity.

9. The method of claim 8, further comprising mapping both the anomalous process activity and the generated contextual metadata to a project component.

10. A computing system comprising:
at least one processor;
at least one memory connected to the at least one processor;
a non-transitory computer readable medium with stored instructions, wherein the instructions when executed by the at least one processor cause the at least one processor to:
monitor an on-going project that comprises a plurality of processes that are performed during the on-going project over a time range, wherein each process of the plurality of processes includes process activities that occur during the process;
apply a machine learning model that (i) identifies a group of projects that are a similar type as the on-going project and (ii) is configured to detect anomaly processes;
wherein the machine learning model generates an expected level of process activities that are expected to occur for each of the plurality of processes during each of the plurality of time periods,
for each process, determine by the machine learning model, the expected level of process activities based at least in part on historical activity levels for each of the process activities that occurred in a given process in a given time period compiled from the group of projects;
take a snap shot of the on-going project at a first time period and determining observed levels of process activities that occurred in each of the plurality of processes, wherein the observed level of a process activity is calculated as a number of occurrences within the snapshot of the process activity;

compare, by the machine learning model for each of the processes, the observed levels of process activities to the expected levels of process activities in a corresponding time period;

if the observed levels of process activities fail to fall within a range of the expected levels of process activities in the corresponding time period, generate an anomaly alert for the associated process; and generate a display including an identification of the plurality of processes of the on-going project and visually distinguishing one or more of the processes for which the anomaly alert was generated.

11. The computing system of claim 10, wherein the instructions for comparing the observed levels of process activities further include instructions that when executed by the at least one processor cause the at least one processor to:

contextually compare a combination of the expected levels of process activities that should occur in the corresponding time period to a combination of the observed levels of process activities; and generate the anomaly alert for the associated process if the combinations fail to match or fall within a contextual threshold value or range.

12. The computing system of claim 10, wherein the instructions that when executed by the at least one processor cause the at least one processor to:

define the process activities as a plurality of activity types including project correspondence or mails that are sent and received, documents created and transmitted, workflows created and executed, wherein each process activity is associated with different processes of the on-going project at different times during the on-going project.

13. The computing system of claim 10, further including the instructions that when executed by the at least one processor cause the at least one processor to:

process project-specific weighting and calculated metrics to compare the observed levels of process activities against a benchmarking database to identify a level of deviation from the expected levels of process activities.

14. A non-transitory computer readable medium having instructions stored thereon, wherein the instructions when executed by a computing device with at least one processor cause the computing device to:

monitor an on-going project that comprises a plurality of processes that are performed during the on-going project over a time range, wherein each process of the plurality of processes includes process activities that occur during the process;

apply a machine learning model that (i) identifies a group of projects that are a similar type as the on-going project and (ii) is configured to detect anomaly processes;

wherein the machine learning model generates an expected level of process activities that are expected to occur for each of the plurality of processes during each of the plurality of time periods, for each process, determine by the machine learning model, the expected level of process activities based at least in part on historical activity levels for each of the process activities that occurred in a given process in a given time period compiled from the group of projects;

take a snap shot of the on-going project at a first time period and determining observed levels of process activities that occurred in each of the plurality of processes, wherein the observed level of a process activity is calculated as a number of occurrences within the snapshot of the process activity;

compare, by the machine learning model for each of the processes, the observed levels of process activities to the expected levels of process activities in a corresponding time period;

if the observed levels of process activities fail to fall within a range of the expected levels of process activities in the corresponding time period, generate an anomaly alert for the associated process; and generate a display including an identification of the plurality of processes of the on-going project and visually distinguishing one or more of the processes for which the anomaly alert was generated.

15. The non-transitory computer readable medium of claim 14 further including instructions that when executed by the at least one processor cause the at least one processor to:

contextually compare a combination of the expected levels of process activities that should occur in the corresponding time period to a combination of the observed levels of process activities; and generate the anomaly alert for the associated process if the combinations fail to match within a contextual threshold value or fall with a range.

16. The non-transitory computer readable medium of claim 14 further including instructions that when executed by the at least one processor cause the at least one processor to:

define the process activities as a plurality of activity types including project correspondence or mails that are sent and received, documents created and transmitted, workflows created and executed, wherein each process activity is associated with different processes of the on-going project at different times during the on-going project.

17. The non-transitory computer readable medium of claim 14 further including instructions that when executed by the at least one processor cause the at least one processor to:

process project-specific weighting and calculated metrics to compare the observed levels of process activities against a benchmarking database to identify a level of deviation from the expected levels of process activities.

* * * * *